J. Case,
Corn Planter.
N° 81,066. Patented Aug. 18, 1868.
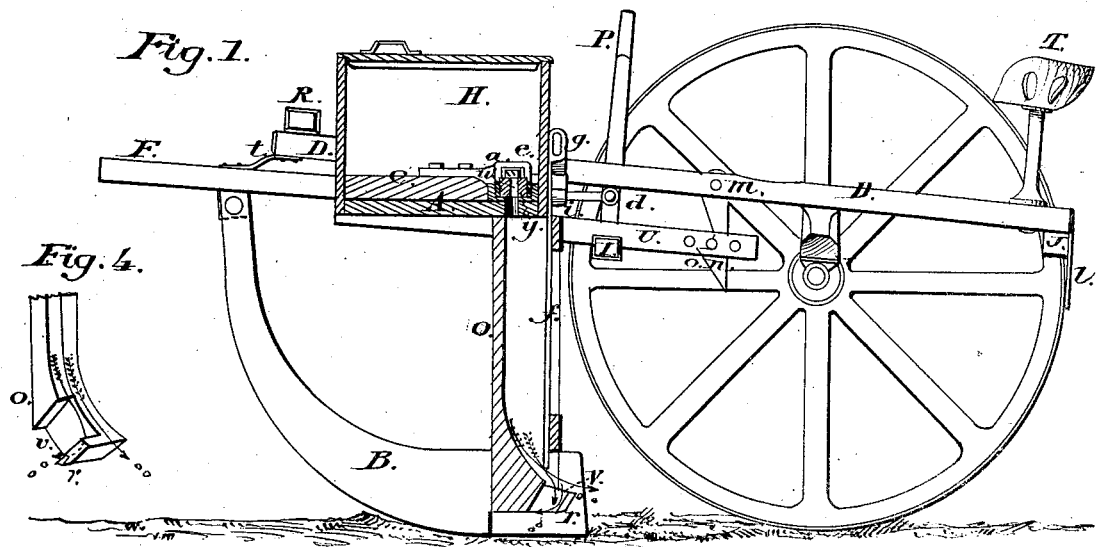
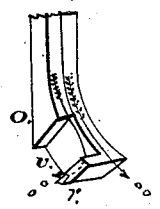
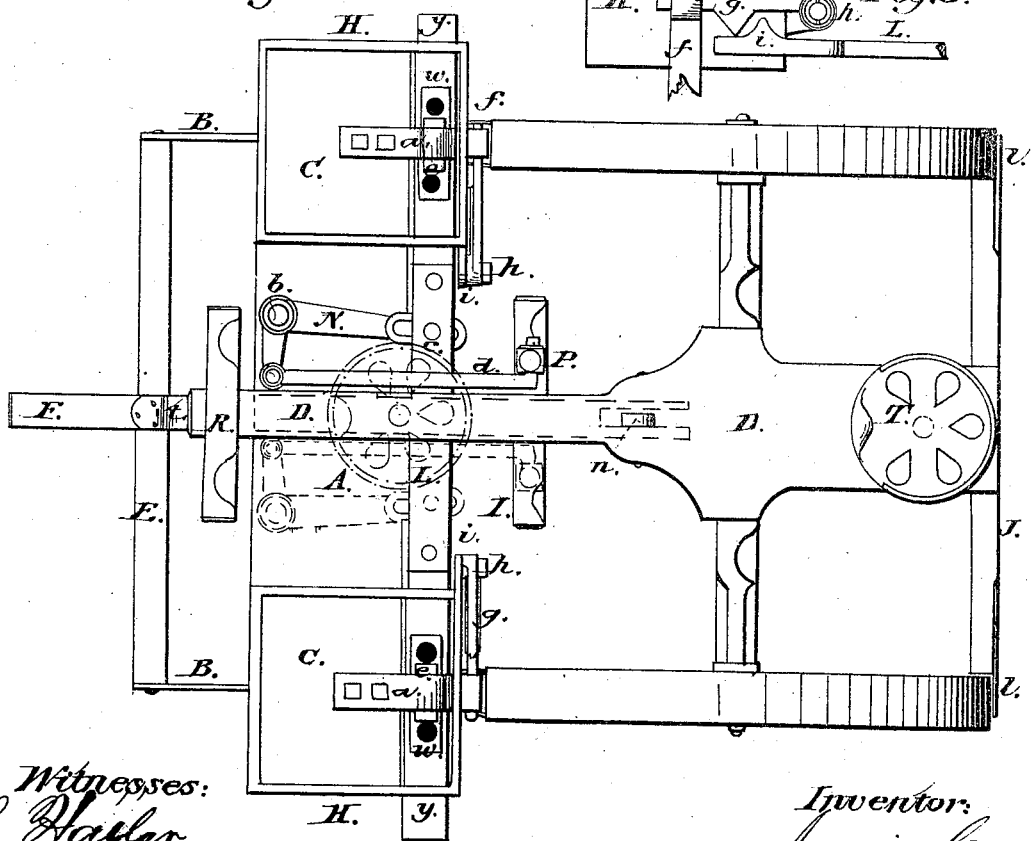
Witnesses:
L. Hasler.
P. T. Dodge.
Inventor:
Jarvis Case.
per Dodge & Munn
his attys.

United States Patent Office.

JARVIS CASE, OF LAFAYETTE, INDIANA.

Letters Patent No. 81,066, dated August 18, 1868.

IMPROVEMENT IN CORN-PLANTERS.

*The Schedule referred to in these Letters Patent and making part of the same.*

TO ALL WHOM IT MAY CONCERN:

Be it known that I, JARVIS CASE, of Lafayette, in the county of Tippecanoe, and State of Indiana, have invented certain new and useful Improvements in Corn-Planters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to that class of machines used for planting corn with a team, and consists in certain improvements in the construction thereof, as hereinafter explained.

Figure 1 is a side elevation, with portion shown in section, on the line $x\cdot x$ of fig. 2.

Figure 2 is a top plan view, and

Figures 3 and 4 are views of portions detached.

In constructing my improved machine, I make a rear frame, consisting of an axle mounted on two wheels, and having a plank or platform, D, mounted thereon longitudinally over the centre, as represented in fig. 2. Upon this platform, near the rear end, I locate a seat, T, for the driver, and transversely across its rear end is secured a bar, J, having a scraper, $l$, attached close behind each wheel, for the purpose of scraping off the adhering dirt from the wheels. Just in front of the axle, the platform D is so shaped as to form a seat for the dropper, and to a bar, U, lying underneath the front part of the platform D, as shown in fig. 1, is secured a transverse bar, I, for the dropper to rest his feet upon.

The front part of the machine consists of a transverse bed, A, supported upon two runners, B, the rear ends of which are connected to the bed A, by vertical seed-tubes O, as shown in fig. 1, the front ends of the runners being connected by a cross-bar, E, to which and the bed, a tongue, F, is rigidly secured. A bar, U, is rigidly attached to the under side of the bed A, and extends backward under the platform D, to near the axle, as shown in fig. 1, this bar U being mortised at its rear end, as shown in dotted lines in fig. 2, and provided with a series of transverse holes, where mortised, for inserting a pin, $o$, as shown in fig. 1. To the platform D, directly over the rear end of bar U, is pivoted a hook or catch, $n$, which projects downward, and has its lower end inclined or bevelled, so as to work freely in the mortise, and catch upon the pin $o$ in bar U, as represented in fig. 1.

The platform D extends forward of the bed A, and is connected to the tongue F by means of a flexible or spring metallic strap, $t$, so that when the catch $n$ is unhooked, the rear end of the runners can move to a limited extent vertically, independently of the rear part of the machine, and thus permit them to accommodate themselves to the unevenness of the surface of the soil in planting. When, however, for the purpose of turning the machine, at the ends of the rows, or in travelling to and from the field, it is desired to raise the runners from the ground, the front part is connected rigidly to the rear frame, by means of the catch $n$, when the driver on the seat T will overbalance the front frame, the dropper either getting off or moving on the platform D, so as to shift his weight to the rear side of the axle, and thus elevate the front part, with the runners, clear from the ground.

The seeding-mechanism consists of two hoppers, H, mounted, as usual in this class of machines, on opposite ends of the bed A, directly over the runners, and in line with the wheels. Through each of these hoppers, H, extends a seed-slide, connected to a bar, L, which is operated by means of an elbow-lever, N, pivoted at $b$ upon the bed A, its rear end being slotted and connected to the bar L by a pin, $c$, as shown in fig. 2. To the other arm of the elbow-lever N is pivoted a rod, $d$, which extends back as far as the foot-rest I, where it is connected to an upright lever, P, the lower end of which rests loosely in a mortise or recess in the foot-rest I, there being a similar mortise in the bar I, on the opposite side of D, and the elbow-lever N, with its rod $d$, being made removable, so that they can be placed on the opposite side, to enable the dropper to use either his right or left hand at will, as indicated by the red lines in fig. 2.

The cut-off $e$ is made of rubber, and is secured by a metallic piece, $a$, to a bottom board, C, which fits loosely in the bottom of the hopper H, so that whenever desired to change the seed-slides $w$, which are made detachable, the bottom, C, with the cut-offs $e$, can be lifted out, thus allowing free access to the seed-slides $w$. To adapt the machine to planting seeds of various sizes, such as corn, sorghum, broom-corn, &c., I provide a series of seed-slides, $w$, having holes or cells of different sizes, according to the size and quantity of seed to be planted, these seed-slides fitting snugly in suitable mortises in the larger slides, $y$, as shown in fig. 2, so that they can be readily removed and others substituted at pleasure.

The seed-tubes O are placed directly under the openings in the bottom of the hoppers H, as usual, and have their lower ends terminating a short distance above the heel of the runner, to prevent them from becoming clogged with earth, as shown in fig. 1. The lower end of these tubes O has a solid portion extending backward, as shown in section in fig. 1, thus forming a curved or inclined chute or passage for the grain. Near its rear end, a vertical duct or passage, $v$, is cut in one side of this solid projecting portion of the tube O, this duct or passage $v$ being cut to about one-half of the thickness of the solid part, as shown in fig. 4. It will thus be seen that the grains, as they pass out of the lower end of the tube, will be divided, one portion falling through the duct $v$, as shown by the black arrow, while the other portion passes out at the rear, as shown by the red arrow, figs. 1 and 4, thus separating or scattering the kernels in the hill, and giving the stalks a better chance to grow without being crowded, as is the case where all are deposited close together, as is usual with most machines heretofore made.

In the rear side of the tubes O, which are made open, are placed vertically-moving valves, $f$, the upper ends of which are connected to a lever, $g$, pivoted to the rear edge of the bed A, or to the hopper, as shown in fig. 3. The levers $g$ are formed with a cam on their lower edge, and directly under them are placed slides, $i$, having a similar cam or projection on their upper edges; these slides $i$ being attached rigidly to the sliding bar L, so that whenever the bar L is moved, the slides $i$ are moved also, and as they come in contact with the projections on the levers $g$, they raise the valves $f$, and thus permit the escape of the seed in the bottom of the tubes O, the movements of the parts being so timed, that the valves $f$ shall close in time to catch and hold in the tubes O the seed that falls from the hopper above, ready for being deposited in the furrow at the succeeding movement of the slides, as is customary in this class of machines.

In planting what is termed "sod-corn," and where it is necessary to throw more weight upon the runners, in order to make them cut the necessary furrow in the sod, I move the driver's seat, T, from its position at the rear of the platform, forward to the position shown in blue in fig. 2, thus bringing the weight of the driver over the bed A, and upon the runners B, thereby forcing them into the earth, and thus securing the proper depth of furrow.

In those portions of the country where this class of machines is used, farmers are generally provided with what are known as sulkey-cultivators, which consist of a frame mounted on two wheels, with cultivator-teeth attached, and having a seat for the driver to ride upon. Where such are in use, the front part of my planter may be attached to and used with the cultivator-frame, thus dispensing with the rear portion of the planter, and saving considerable expense to the farmer, and this can be the more readily done, as the two machines separately are never both required for use at the same season of the year, the planter being used at planting-time or early in the season, and the cultivator being required for use as a cultivator later in the season, or after the corn has grown to a considerable height.

By these means I am enabled to produce a machine that operates in a very perfect manner, is adapted to planting a variety of seeds, and upon various soils, and that can be cheaply constructed.

Having thus described my invention, what I claim, is—

1. Connecting the front and rear frames of the machine by means of the flexible plate $t$, when said parts are combined substantially as described.

2. The catch $n$, pivoted to the rear frame, and arranged to engage with the bar U, for locking the front and rear frames rigidly together, substantially as and for the purpose set forth.

3. The scattering-device, arranged in the lower end of the seed-tubes, when constructed substantially as described.

4. The seat T, when arranged to be adjusted in rear of the axle, or over the front part of the platform, substantially as described.

5. The combination of the valve $f$, pivoted cam $g$, and sliding arm $i$, attached to the seed-slides, constructed and arranged to operate substantially as shown and described.

6. The removable hopper-bottom C, having the cut-off $e$ attached thereto, when constructed and arranged substantially as shown and described.

JARVIS CASE.

Witnesses:
MARK JONES,
ERNST FLISHHAWAR.